United States Patent [19]

Fullinwider et al.

[11] 4,014,801
[45] Mar. 29, 1977

[54] PROCESS FOR BREAKING POLYMER-CONTAINING EMULSIONS

[75] Inventors: James H. Fullinwider, Englewood, Colo.; Bruce L. Knight, Findlay, Ohio

[73] Assignee: Marathon Oil Company, Findlay, Ohio

[22] Filed: Sept. 30, 1974

[21] Appl. No.: 510,190

[52] U.S. Cl. .................... 252/8.55 D; 166/305 R; 252/330
[51] Int. Cl.² ........................................ B01D 17/04
[58] Field of Search ............ 252/330, 358, 8.55 D; 166/305 R

[56] References Cited

UNITED STATES PATENTS

| | | | |
|---|---|---|---|
| 2,064,541 | 6/1934 | Hershman | 252/330 |
| 2,566,980 | 11/1949 | Catanach et al. | 252/330 |
| 2,572,223 | 10/1951 | Shapiro et al. | 252/330 |
| 3,363,399 | 1/1968 | Schmauch et al. | 252/330 X |
| 3,752,233 | 8/1973 | Svaldi et al. | 166/305 R X |
| 3,858,657 | 1/1975 | Haws et al. | 166/305 R X |

OTHER PUBLICATIONS

Berkman and Egloff: *Emulsions and Foams*, Reinhold Pub. Corp., (1941), pp. 21–22, 286.

*Primary Examiner*—Herbert B. Guynn
*Attorney, Agent, or Firm*—Joseph C. Herring; Jack L. Hummel

[57] ABSTRACT

Oil and water emulsions containing a high molecular weight polymer (e.g. a partially hydrolyzed polyacrylamide) and a surfactant (e.g. monovalent cation-containing petroleum sulfonate) are broken with a deemulsifying agent made up of a divalent cation-containing salt, e.g. $CaCl_2$, and a strong oxidizing or reducing agent, e.g. sodium hypochlorite or hydrazine.

20 Claims, No Drawings

PROCESS FOR BREAKING POLYMER-CONTAINING EMULSIONS

BACKGROUND OF THE INVENTION

1. Field of the Invention

This invention relates to a process for breaking oil and water emulsions containing high molecular weight polymers and surfactants.

2. Prior Art

The following U.S. patents disclose various approaches to emulsion breaking and polymer degradation:

U.S. Pat. No. 1,515,093 to Crites et al teaches dehydrating oil by treating it with $CaCl_2$ at a temperature of 140° to 200° F.

U.S. Pat. No. 2,064,541 to Hershman teaches desalting crude oil and breaking petroleum oil emulsions by treatment with a compound containing an —OCl group (e.g. sodium hypochlorite) and a peroxide.

U.S. Pat. No. 3,363,399 to Schmauch et al teaches purifying water contaminated with oil heavier than water by treatment with a de-emulsifying agent, preferably an electrolyte (e.g. calcium chloride).

U.S. Pat. Nos. 3,554,289, 3,684,015, 3,771,602 and 3,799,265 to Webb teach breaking hydrocarbon/water emulsions surrounding a wellbore by injecting a micellar dispersion to "solubilize" the emulsion.

U.S. Pat. No. 3,556,221 to Haws teaches reducing polymer plugging in a subterranean formation by injecting an aqueous solution having a pH of at least 8 and containing a compound of the formula MOX wherein M is an alkali metal or ammonium ion and X is a halogen (e.g. sodium hypochlorite).

Oil and water produced from oil-bearing subterranean formations by aqueous flooding, miscible flooding or other secondary recovery processes can contain significant amounts of oil and water emulsions. When these emulsions contain surfactant and high molecular weight polymer, they tend to be stable. The presence of surfactant facilitates both water retention in the lower density hydrocarbon phase and hydrocarbon emulsification in the aqueous phase. The presence of a high molecular weight polymer increases the viscosity of the aqueous phase, further compounding the problems of hydrocarbon/water phase separation. Since the hydrocarbon phase must be separated from the remainder of the emulsion before it can be efficiently refined, breaking of these emulsions becomes critical. Normal emulsion breaking techniques, e.g. settling in tanks, heat treatment, desalting, etc., are relatively inefficient, especially when considered within the economic framework of a large-scale production facility.

SUMMARY OF THE INVENTION

Applicants have found that emulsions containing hydrocarbon, surfactant, high molecular weight polymer and water may be broken by incorporating in the emulsion a de-emulsifying agent containing a divalent cation-containing salt and a strong oxidizing or reducing agent.

DESCRIPTION OF THE PREFERRED EMBODIMENTS

Emulsions to be broken by the present invention include those obtained in the production of crude oil and those formed in a subterranean formation. They may be present as the result of a micellar dispersion flooding process disclosed in U.S. Pat. No. 3,275,075 to Gogarty et al. More particularly, this technology is useful with emulsions obtained from reservoirs flooded with a surfactant-containing slug followed by an aqueous solution containing a high molecular weight polymer as well as emulsions formed in situ during a polymer flooding process. The emulsion preferably contains hydrocarbon, surfactant, water, and a high molecular weight polymer. The emulsion may also contain cosurfactants and other additives.

The hydrocarbon of the emulsion will usually be crude oil from a hydrocarbon-bearing subterranean formation. However, if the emulsion results from a micellar dispersion flooding process, the hydrocarbon may be any hydrocarbon which was used in the micellar dispersion. Examples of such hydrocarbons include crude oil, partially refined fractions of crude oil, refined fractions of crude oil, synthesized hydrocarbons, side cuts from crude columns, crude column overheads, gas oils, kerosenes, heavy naphthas, naphthas, straight-run gasoline, liquefied petroleum gases, propane, pentane, heptane, decane, dodecane, cyclohexane, aryl compounds, substituted aryl compounds, etc.

The aqueous phase of the emulsion may consist of connate water or water introduced into the emulsion as a result of the flooding process. If introduced as a result of an aqueous flooding process, the water may have been injected into the formation as a part of the aqueous polymer solution, an aqueous mobility buffer solution, or as an aqueous drive solution. The water may be fresh water, brine, or brackish water.

Polymers contained in the emulsion generally result from aqueous polymer solutions that have been injected into the subterranean formation for mobility control purposes. Polymers particularly subject to the processes of the present invention include partially hydrolyzed, high molecular weight polyacrylamides (e.g. those marketed under the trade-name "Pusher" by Dow Chemical Co., Midland, Mich., U.S.A.), copolymers of acrylamide and sodium acrylate (e.g. those marketed under the tradename "Insta-Pol" by Nalco Chemical Co., Sugarland, Tex., U.S.A.) and various biopolymers (e.g. polysaccharides marketed under the tradename "Kelzan" by Kelco Chemical Co., Houston, Tex., U.S.A.)

The emulsions of the present invention are broken by incorporating in the emulsion a de-emulsifying agent comprising a divalent cation-containing salt and a strong oxidizing or reducing agent.

The divalent cation-containing salt can be any divalent cation-containing salt which has the effect of causing a more rapid separation of the aqueous and hydrocarbon phases of an emulsion. Examples of such salts include $CaCl_2$, $MgCl_2$, $BaCl_2$, $CdCl_2$, $MnCl_2$, and hydrates thereof. Preferably, the salt is $CaCl_2$. The divalent cation-containing salt may be incorporated into the de-emulsifying agent in amounts of about 1,000 to about 315,000 ppm or more, more preferably about 10,000 to about 250,000 ppm, and most preferably about 50,000 to about 200,000 ppm.

The strong oxidizing or reducing agent may be any oxidizing or reducing agent which effectively "degrades" the polymer contained within the emulsions. Particularly suitable oxidizing agents include those having the formula MOX wherein M is an alkali metal or ammonium ion and X is a halogen. Preferred alkali metal ions include lithium, potassium and sodium. Suitable halogens include fluorine, chlorine, bromine or iodine. Examples of such oxidizing agents include sodium hypochlorite, potassium hypochlorite, potassium hypobromite, sodium hypobromite, ammonium hypochlorite, ammonium hypobromite, etc. The most preferred of these oxidizing agents is sodium hypochlorite. Particularly preferred reducing agents include the polyamines, e.g. triamines and diamines. Particularly useful triamines include guanidine and 1,3,5-triaminobenzene. Useful diamines include the lower mono and dialkyl derivatives of diamines represented by the formula $N_2H_2RR'$ wherein R contains from about 1 to about 6 carbon atoms and R' contains from about 0 to 6 carbon atoms. The most preferred polyamine is hydrazine. The strong oxidizing or reducing agent may be incorporated into the de-emulsifying agent in concentrations of about 1,000 to about 225,000 ppm, more preferably about 5,000 to about 175,000 ppm, and most preferably about 10,000 to about 150,000 ppm. The presence of a high molecular weight polymer in the aqueous phase of the emulsion increases its viscosity and thereby hinders normal emulsion-breaking techniques. The process of the present invention degrades the polymer in the aqueous phase of the emulsion, thereby reducing the viscosity of the overall emulsion and allowing the divalent cation-containing salt to effect a more rapid separation of the aqueous and hydrocarbon phases.

In treating produced crude oil with the process of the present invention, about 10 to about 100% by volume, more preferably about 20 to about 80% by volume, and most preferably about 40 to about 60% by volume of the de-emulsifying agent will generally be agitated into the produced crude oil and the mixture allowed to separate in a settling tank or other appropriate storage vessel. The time required for phase separation, compared to prior art methods, is significantly reduced, resulting in less storage time in the settling tank and therefore greater economy.

The present process may also be utilized to break hydrocarbon, surfactant, high molecular weight polymer, and water emulsions which have formed an "emulsion block" in a subterranean formation. In such a case, 0.1 to about 2.0 or more PV (pore volumes) of de-emulsifier, based on the portion of the formation to be treated, are injected into the formation, followed by sufficient drive fluid to advance the de-emulsifier to the location of the emulsion plug. If desired, a mobility buffer slug may be injected behind the de-emulsifier.

Although not required, emulsion phase separation may be enhanced by techniques known in the art. For example, by subjecting an emulsion to a temperature above ambient temperature after the incorporation of de-emulsifier in the emulsion, more rapid phase separation can be achieved. Preferred elevated temperature ranges are about 90° to about 150° F and more preferably about 120° to about 130° F.

The following examples illustrate a preferred embodiment of the invention. Unless otherwise specified, all percents are based on volume.

EXAMPLE I

An emulsion is formed containing the following components: 25 ml of Henry crude oil (from the Henry lease, Crawfored County, Ill., viscosity = 6.5 cp at 72° F), 25 ml of an aqueous polymer solution containing 100 ppm of Dow "Pusher" 700, marketed by the Dow Chemical Co., Midland, Mich., U.S.A., in water containing 435 ppm total dissolved solids (282 ppm is hardness measured as ppm of $CaCo_3$) and 5 ml of a surfactant slug containing 7.7 wt.% Henry crude oil, 14.0 wt.% petroleum sulfonate (average equivalent weight = 360, 25% active), 3.0 wt.% $NH_4SO_4$ and 75.3 wt.% distilled water. The mixture is agitated for 1 minute and then subjected to one of the following treatments:

Treatment

A. Control. No treatment.
B. Addition of 45 ml of an aqueous solution containing 20% of a 5.25 wt.% hypochlorite solution and 80% of a saturated aqueous $CaCl_2$ solution (59.5 gm $CaCl_2$/100 ml distilled water).
C. Addition of 45 ml of an aqueous solution containing 36 ml of a saturated $CaCl_2$ solution and 9 ml of distilled water.
D. Addition of 45 ml of an aqueous solution containing 9 ml of a 5.25 wt.% sodium hypochlorite solution and 36 ml of distilled water.

The emulsion is again agitated and then allowed to settle. Table 1 indicates the rate of separation of the emulsion under the various treatments.

TABLE 1

| | Volume of Distinct Oil Phase (in ml) | | | |
|---|---|---|---|---|
| | Treatment | | | |
| Time (minutes) | A | B | C | D |
| 0 | — | — | — | — |
| 5 | 3 | 32 | 35 | 22 |
| 10 | 6 | 29 | 32 | 23 |
| 15 | 10 | 27 | 31 | 23 |
| 20 | 13 | 26 | 30 | 24 |
| 25 | 16 | 26 | 29 | 24 |
| 30 | 20 | 26 | 29 | 25 |
| 35 | 21 | 26 | 28 | 25 |
| 50 | 26 | 26 | 28 | 26 |
| 100 | 28 | 26 | 28 | 26 |
| 140 | 30 | 26 | 28 | 26 |
| 200 | 30 | 26 | 27 | 26 |
| 290 | 30 | 26 | 27 | 26 |

The volume of "Distinct Oil Phase" in column A, more specifically the 28 ml and 30 ml, contains water, i.e., it is self evident from a calculation of the hydrocarbon in the emulsion of Example 1 that the maximum amount of distinct oil phase can not exceed 26 ml.

EXAMPLE II

The experiment in Example I is repeated using 25 ml of 1,000 ppm Dow "Pusher 700" in water containing 435 ppm of total dissolved solids. The results are indicated in Table 2.

TABLE 2

| | Volume of Distinct Oil Phase (in ml) | | | |
|---|---|---|---|---|
| | Treatment | | | |
| Time (minutes) | A | B | C | D |
| 0 | — | — | — | — |
| 5 | 8 | 29 | 32 | 10 |
| 10 | 14 | 28 | 30 | 11 |
| 15 | 19 | 27 | 28 | 18 |
| 20 | 21 | 26 | 27 | 23 |
| 25 | 22 | 26 | 27 | 24 |
| 30 | 22 | 26 | 26 | 26 |
| 35 | 23 | 26 | 26 | 26 |
| 50 | 31 | 26 | 26 | 26 |
| 100 | 31 | 26 | 26 | 26 |
| 140 | 31 | 26 | 26 | 26 |
| 200 | 31 | 26 | 26 | 26 |
| 290 | 31 | 26 | 26 | 26 |

As can be seen from the foregoing examples, treatment of the emulsion with a combination of a strong oxidizing agent and a divalent cation-containing salt results in a faster breaking of the emulsion (as evidenced by less time required for phase stabilization) than is achieved by treatment with either the strong oxidizing agent or the divalent cation-containing salt alone.

EXAMPLE III 55 ml of the emulsion of Example I is treated with 45 ml of an aqueous solution containing 20% of a 1.0 wt.% hydrazine solution and 80% of a saturated aqueous $CaCl_2$ solution (59.5 gm $CaCl_2$/100 ml distilled water). Efficient phase separation of the emulsion is realized.

A variety of modifications and variations will be apparent to those skilled in the art. Such modifications are intended to be included within the scope of the invention.

We claim:

1. In a process of breaking an emulsion containing hydrocarbon, water, surfactant, and a high molecular weight polymer, the step comprising incorporating in the emulsion an aqueous solution comprising at least about 1,000 ppm of a chloride salt hydrate or a mixture thereof of a divalent cation wherein the cation is calcium, cadmium, manganese or magnesium fluoride is chloride, bromide, iodide or fluoride and at least about 1,000 ppm of a strong oxidizing agent selected from the group consisting of lithium, sodium, potassium and ammonium hypochlorites and hypobiomites.

2. The process of claim 1 wherein the emulsion is contacted with the aqueous solution in a subterranean oil-bearing formation.

3. The process of claim 1 wherein the emulsion is contacted with the aqueous solution after the emulsion has been produced from an oil-bearing subterranean formation.

4. The process of claim 1 wherein the salt concentration in the aqueous solution is about 50,000 to about 200,000 ppm.

5. The process of claim 1 wherein the aqueous solution is saturated with $CaCl_2$ or a hydrate thereof.

6. The process of claim 1 wherein the strong oxidizing agent is sodium hypochlorite.

7. The process of claim 7 wherein the strong oxidizing agent concentration in the aqueous solution is about 10,000 to about 150,000 ppm.

8. The process of claim 1 wherein the polymer is a partially hydrolyzed polyacrylamide.

9. The process of claim 1 wherein the polymer is a copolymer of acrylamide and sodium acrylate.

10. The process of claim 1 wherein the polymer is a polysaccharide.

11. The process of claim 1 which further comprises subjecting the emulsion and aqueous solution to a temperature above ambient temperature.

12. The process of claim 1 wherein about 10 to about 100% by volume of aqueous solution is incorporated into the emulsion.

13. In a process of breaking an emulsion containing oil, water, surfactant and high molecular weight polymer, the step comprising incorporating in the emulsion an aqueous solution comprising about 1,000 to about 315,000 ppm of a chloride salt selected from the group consisting of $CaCl_2$, $MgCl_2$, $CdCl_2$, $MnCl_2$, the hydrates thereof and a mixture of two or more of the salts and/or hydrates, and about 1,000 to about 225,000 ppm of sodium hypochlorite, potassium hypochlorite or ammonium hypochlorite.

14. The process of claim 13 wherein the polymer is a partially hydrolyzed polyacrylamide.

15. The process of claim 13 wherein the polymer is a copolymer of acrylamide and sodium acrylate.

16. The process of claim 13 wherein the polymer is a polysaccharide.

17. The process of claim 13 wherein said chloride salt is $CaCl_2$.

18. The process of claim 13 wherein sodium hypochlorite is used.

19. The process of claim 13 which further comprises subjecting the emulsion and the aqueous solution to a temperature above ambient temperature.

20. The process of claim 13 wherein about 10 to about 100% by volume of aqueous solution is incorporated into the emulsion.

* * * * *